United States Patent [19]

Myers et al.

[11] 4,118,452
[45] Oct. 3, 1978

[54] TWO-STAGE PROCESS FOR INDUSTRIAL BLOW MOLDING

[75] Inventors: Robert A. Myers, Sylvania; Albert R. Uhlig, Toledo, both of Ohio

[73] Assignee: Owens-Illinois, Inc., Toledo, Ohio

[21] Appl. No.: 761,196

[22] Filed: Jan. 21, 1977

Related U.S. Application Data

[63] Continuation of Ser. No. 558,952, Mar. 17, 1975, abandoned.

[51] Int. Cl.² .............................................. B29C 17/07
[52] U.S. Cl. ....................................... 264/89; 264/98; 425/530; 425/534
[58] Field of Search .................... 264/89, 94, 96, 98, 264/99, 296; 425/530, 532, 534, 537

[56] References Cited

U.S. PATENT DOCUMENTS

| | | | |
|---|---|---|---|
| 3,100,317 | 8/1963 | Perry | 264/98 |
| 3,211,815 | 10/1965 | Cordialie et al. | 264/98 X |
| 3,363,282 | 1/1968 | Hagen | 264/94 X |
| 3,452,391 | 7/1969 | Langecker | 425/DIG. 214 |
| 3,504,396 | 4/1970 | Button et al. | 425/213 |
| 3,767,747 | 10/1973 | Uhlig | 425/DIG. 215 |
| 3,781,395 | 12/1973 | Uhlig | 425/DIG. 215 |
| 3,792,140 | 2/1974 | Schiemann | 425/DIG. 214 |
| 3,833,702 | 9/1974 | Boyer | 264/161 |
| 3,873,660 | 3/1975 | Reilly et al. | 264/296 |
| 3,928,522 | 12/1975 | Farrell | 264/89 |

*Primary Examiner*—Jan H. Silbaugh
*Attorney, Agent, or Firm*—Richard D. Heberling; David H. Wilson, Jr.; Myron E. Click

[57] ABSTRACT

An improved method and apparatus for two-stage blow molding especially suitable for large plastic containers, wherein an overhead shuttle mechanism transfers a blown preform from a preform station to a final blowing station and then to a separation station where the completed article is separated from the upper tail by which it was suspended from the shuttle mechanism during each of the transfer steps. The lower tail is separated from the preform prior to removal from the preform blowing station.

An alternative form uses a rotary indexing transfer mechanism, wherein the shape of an upper flash or tail-forming clamp half which is carried by the indexing mechanism creates an interlock with the flash permitting the article to be suspended from and transferred by such single clamp half throughout the operation.

The method and apparatus can be utilized to provide a two-stage blow-molded container having integrally formed, threaded bungs by the use of a pair of bung-forming inserts slipped over a pair of upwardly opening blow needles whose center distance is variable by a toggle mechanism. The cylindrical parison is extruded downwardly over the pair of blow nozzles when they are at their minimum spacing, after which they are spread apart to elliptically stretch the parison just prior to closing of the preform mold and blowing. The preform, with the bung forming inserts now captured by the lower pinched portion thereof, is transferred to a final blow mold, where the blow nozzles are inserted through the inserts for final blowing.

3 Claims, 31 Drawing Figures

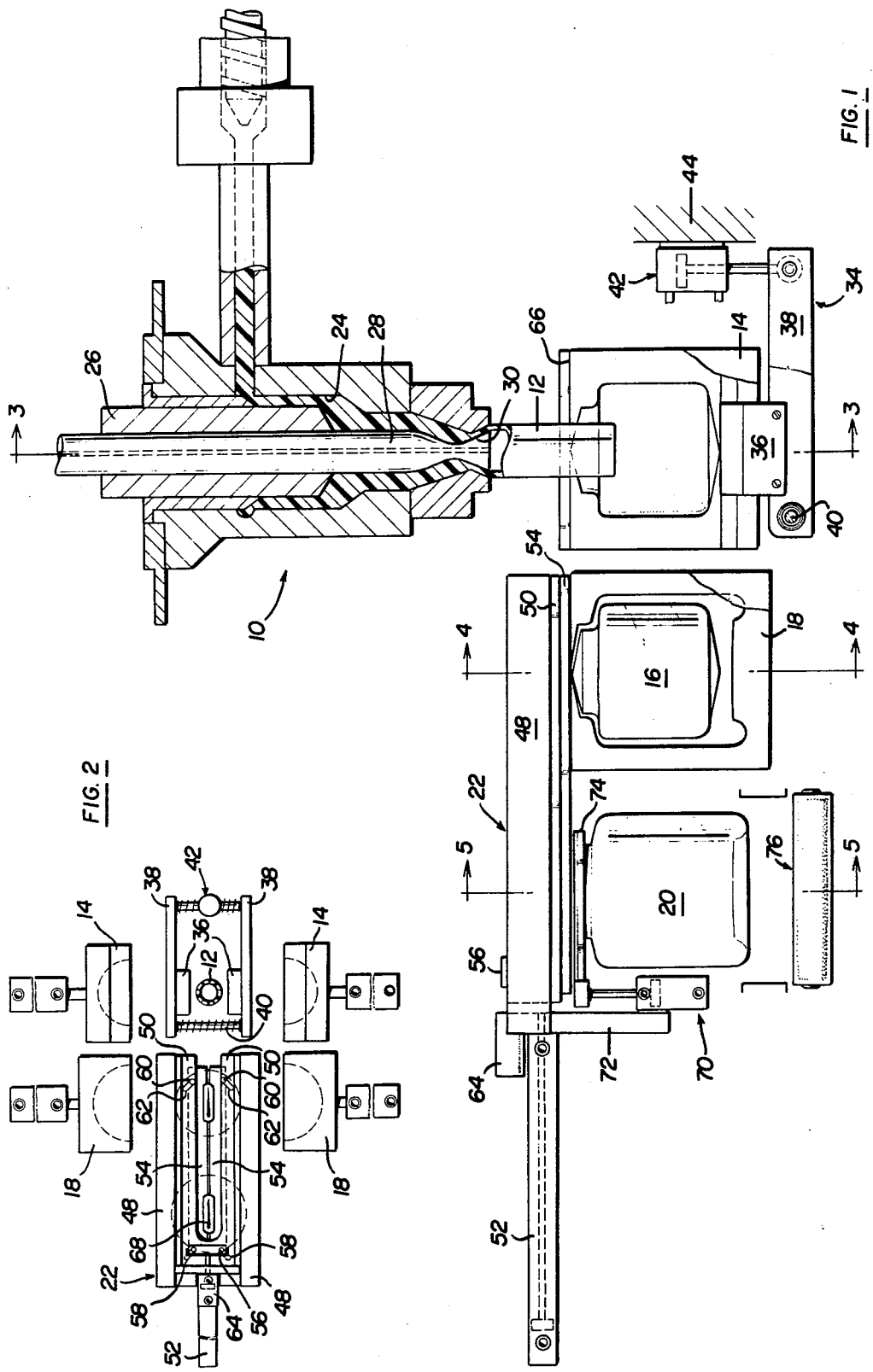

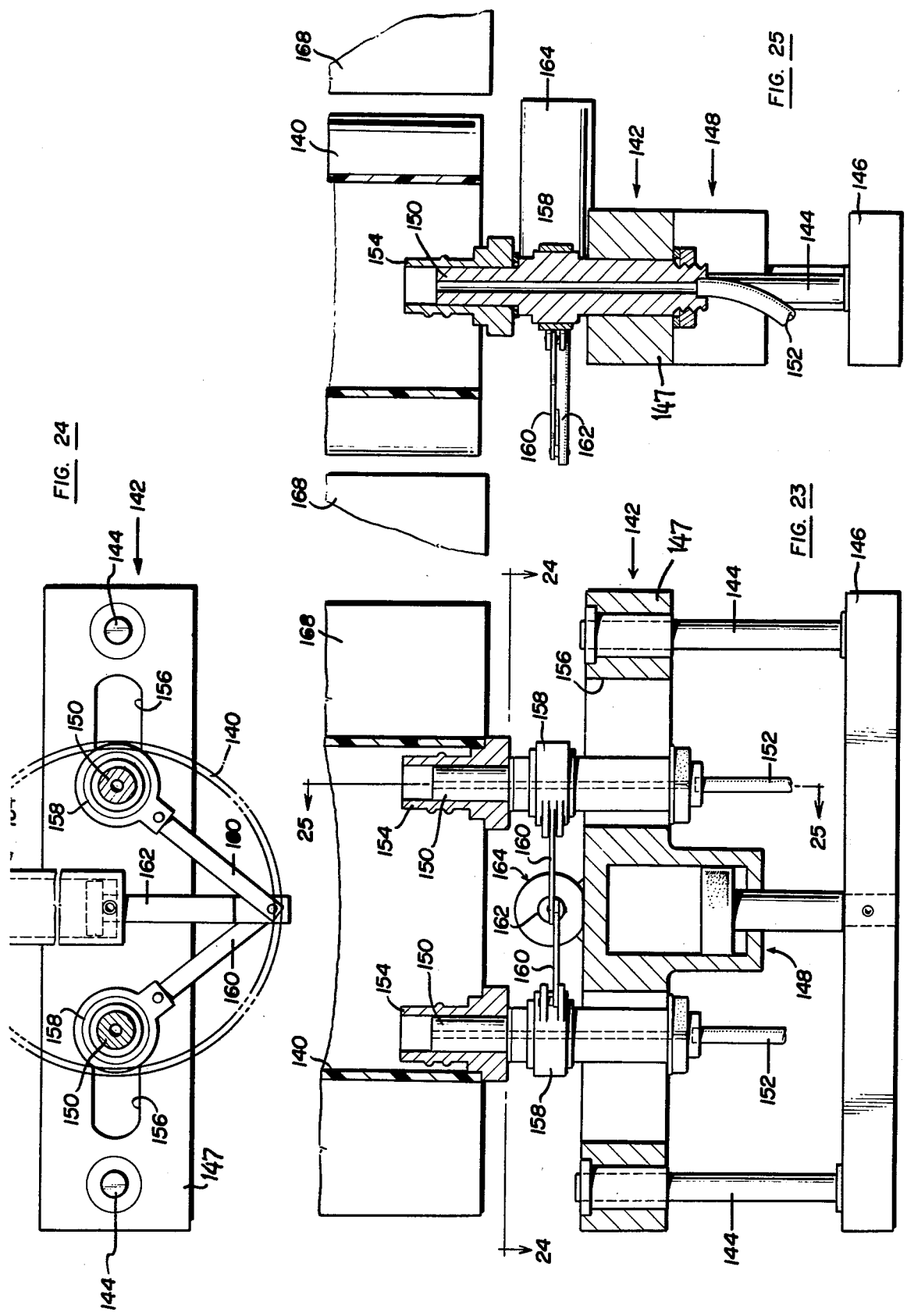

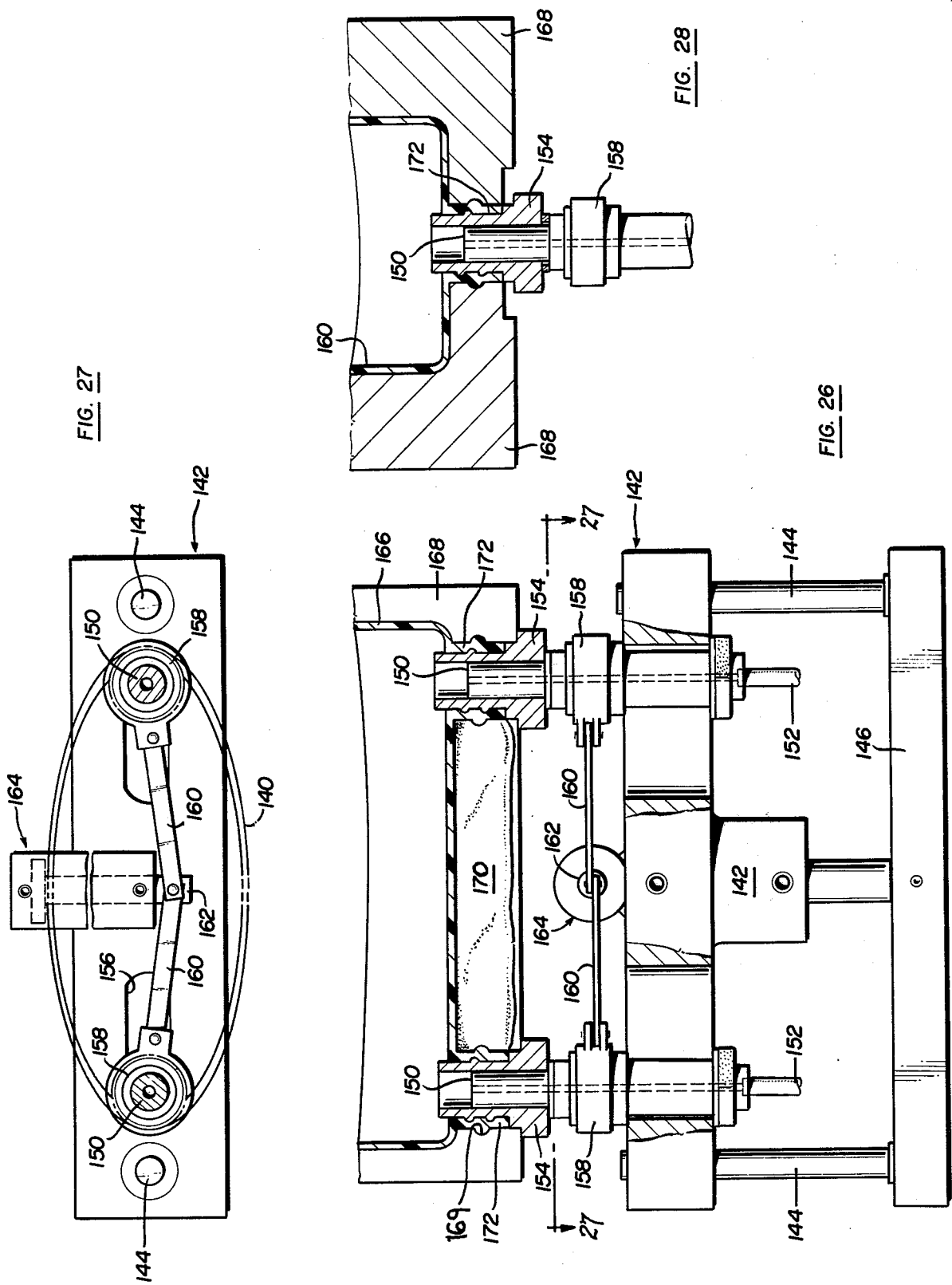

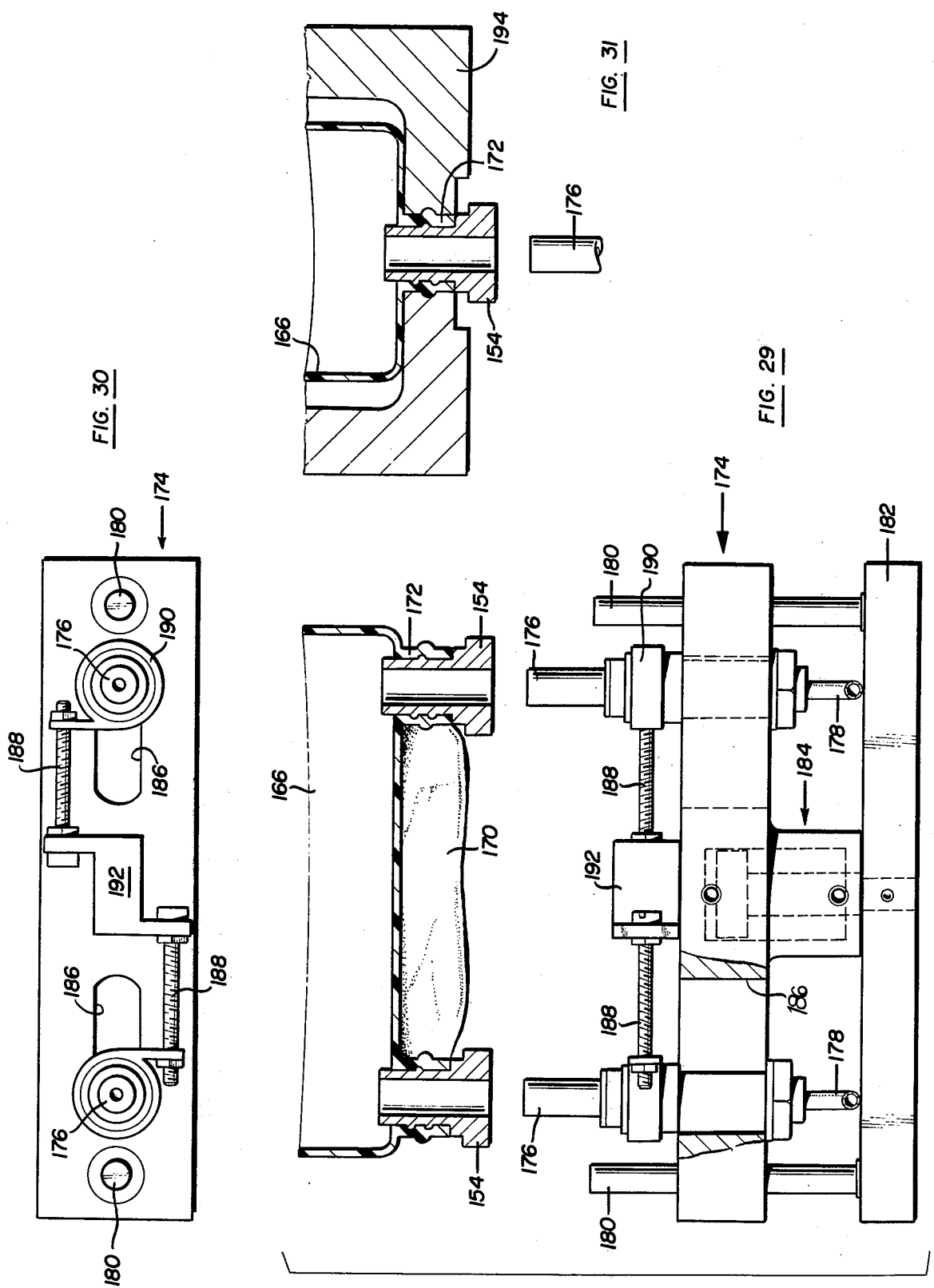

TWO-STAGE PROCESS FOR INDUSTRIAL BLOW MOLDING

This is a continuation of application Ser. No. 558,952 filed Mar. 17, 1975 now abandoned.

BACKGROUND OF INVENTION

The prior art contains several suggestions of methods and apparatus for obtaining bi-axial orientation in thermoplastic material which has been formed into containers by the two-stage blow-molding technique. These prior art systems utilize "free-extrusion" blow molding machines wherein a pendant tube or parison of thermoplastic material is issued from a downwardly facing orifice. Two successive blowing operations are then performed on the parison by closing an initial preform mold on the parison and blowing and thereafter placing such preform into a second mold cavity for blowing to the final desired size and shape.

These two-stage blowing operations are particularly advantageous in the formation of large containers in that such technique does not require such a large parison, and therefore, substantially reduces the amount of flash and the accompanying requirement for reprocessing of the flash. Two-stage blowing also permits better and more uniform material distribution notwithstanding the increased size of the final product.

Heretofore, the sequential registration of the preform and final blow molds with the parison has been accomplished either by shuttling the molds over a stationary parison and preform or by transporting the preform from one mold to the other on a blow pipe. Examples of these prior art techniques are found in U.S. Pat. Nos. 3,767,747 and 3,781,395.

BRIEF DESCRIPTION OF THE INVENTION

Two alternative methods and apparatus for transferring the preformed article between the preform blow mold and the final blow mold are disclosed herein. The first involves a linear shuttle type transfer mechanism and the second involves a rotary indexing type of transfer mechanism. In both types of mechanisms, the initial parison is extruded downwardly between the open sections of a fixed preform blow mold.

In the shuttle transfer mechanism, the extruded parison is gripped by the transfer mechanism interposed between the preform mold and the overhead extrusion mechanism, the parison being gripped immediately above the point where it is pinched shut by the upper portion of the preform mold sections. The extreme upper end of the parison is severed by a programming pin in the die head or extruder, and the parison is inflated by a blow needle carried by one of the mold sections. While the molds are closed, and preferably after initial blowing, the lower tail of the preform is pulled downwardly and removed by a tail-clamping mechanism.

When the preform mold sections are opened, the pendant preform is transported by the shuttle mechanism to the final blowing station, the preform being suspended from the shuttle mechanism by the clamped upper tail. Upon closing of the mold sections, at the final blowing station, the blow needle enters the same hole formed by the needle of the preform stage.

Simultaneously, the stroke of the shuttle mechanism has transferred a previously completed product from the final blow station to a separation station, where the product is pulled downwardly and removed from its tail, which is still clamped between the grippers of the shuttle mechanism. Also simultaneously, a new parison is being extruded at the preform station.

The grippers of the shuttle mechanism then open and are extended to simultaneously (1) reclamp the upper tail of the preform now positioned for blowing within the final mold and (2) clamp the newly extruded parison at the preform station. The cycle is then ready to be repeated, with the newly blown preform being transferred from the preform station to the separation station and the finally blown article being transferred from there to the separation station, all while the upper tails are suspended from the shuttle mechanism.

In the alternatively disclosed rotary indexing type of transfer mechanism, the parison is clamped between two flash clamps located immediately above the upper pinch line of the preform mold halves. The radially outer flash clamp is mounted on the radially outer mold half, while the radially inner flash clamp is mounted on the rotary indexing transfer mechanism. The shape of the inner flash clamp is such that it forms a dovetail-like interlock with the flash that is formed between the clamp halves. Upon subsequent opening of the preform mold and flash clamp, the upper flash or tail is securely suspended from the inner flash clamp half, to facilitate transfer of the preform with the index mechanism to the various subsequent stations. After final blowing, this upper flash or tail and the product suspended therefrom is separated from the transfer mechanism by a cylinder-operated ejection rod sliding within a bore in the inner flash clamp half.

To integrally form internally threaded bungs in a drum formed by a two-stage blowing technique, externally threaded bung-forming inserts are slipped over a pair of upwardly extending blow nozzles which are mounted on a toggle mechanism permitting their center distance to be adjusted. The parison is extruded downwardly as a cylinder having a diameter exceeding the initial minimum center-to-center spacing of the insert-carrying blow nozzles. The toggle mechanism is then actuated to spread apart the blow nozzles and thereby eliptically stretch the parison.

The preform mold halves are then closed upon the stretched parison, with the bung-forming inserts being aligned with and retained by notches in the lower pinching extremities of the mold halves. After blowing by air introduced through the inserts, the preform mold halves are opened and the preform is transferred, as by the shuttle or rotary index technique, to a final blow station where the blown preform is aligned over a pair of blow nozzles spaced to coincide with the location of the bung-forming inserts. The final mold is closed over the preform and the blow nozzles are raised and inserted into the bung-formed inserts for blowing therethrough. After final blowing and removal from the mold, the bung-forming inserts can be threaded back out of the drum, leaving the desired integrally formed internally threaded bungs. Alternatively, the inserts may be left in place to form the bungs.

OBJECTS

It is, therefore, an important object of the present invention to provide an improved method and apparatus for forming large containers, such as drums, utilizing the two-stage blow molding technique and wherein the transfer between molds is carried out by an overhead shuttle mechanism which is either linearly or rotationally movable between stations.

Another important object of this invention is the provision of a method and apparatus for transferring a blown preform to a final blow station by a shuttle mechanism interposed between an extruder and a preform blow mold to engage a waste portion of a parison, the shuttle being actuatable after preform blow molding to transfer the blown preform to a final blowing station.

It is a further important object of this invention to provide an improved method and apparatus for forming large blow-molded containers having integral internally threaded bungs spaced through a distance larger than the diameter of the originally extruded parison.

BRIEF DESCRIPTION OF THE DRAWINGS

FIG. 1 is a side elevation of a two-stage blow molding system of the present invention employing a shuttle type transfer mechanism, showing a parison being extruded at the preform station, a preform positioned at the final blowing station, and a completed product positioned at the separating station, both molds being shown open.

FIG. 2 is a plan view of the system of FIG. 1.

FIG. 23 is a side view, partly in section of the blow nozzle portion of the preform station of a system of the present invention for blowing tight head drums in two stages.

FIG. 24 is a plane view taken along the plane 24—24 of FIG. 23, showing the extruded parison in phantom.

FIG. 25 is a side sectional view of the structure of FIG. 23.

FIG. 26 is a view similar to FIG. 23, but showing the parison after stretching and closure of the preform blow mold.

FIG. 27 is a plan view taken along the plane 27—27 of FIG. 26, the stretched parison being shown in phantom.

FIG. 28 is a partial side sectional view of the structure of FIG. 26.

FIG. 29 is a side view similar to FIG. 23 showing the lower portion of the preform in position over the final blow nozzles.

FIG. 30 is a top view of the final blow nozzle structure of FIG. 29.

FIG. 31 is a partial side sectional view of the structure of FIG. 29.

DETAILED DESCRIPTION OF THE PREFERRED EMBODIMENTS

EMBODIMENT OF FIGS. 1-9

Figure 3:
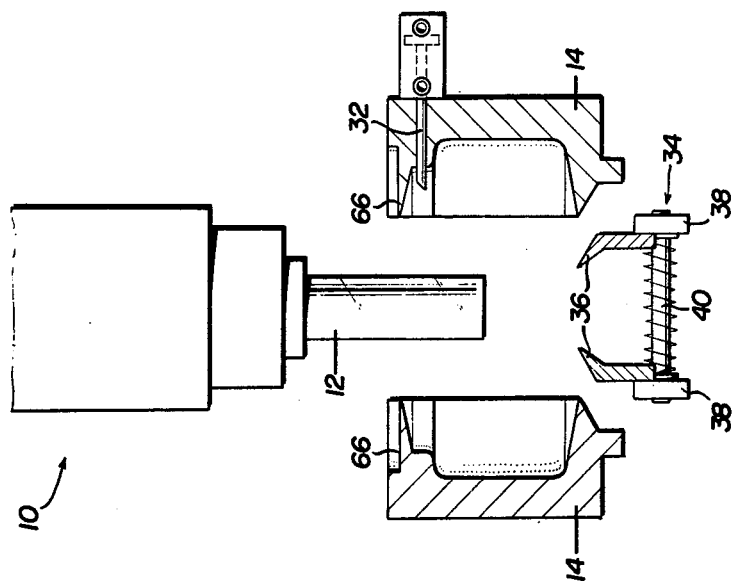
FIG. 3 is a side view, partly in section, taken along the plane 3—3 of FIG. 1.

Referring to FIG. 1 of the drawings, the apparatus of the embodiment of the present invention utilizing a shuttle type transfer mechanism generally comprises an extrusion head 10 which extrudes a parison 12 in a downward direction between open opposed preform blow mold sections 14 wherein the parison is subsequently blown into a container preform 16. The preform 16 is subsequently transferred to a pair of final blow mold sections 18 wherein a second stage blowing operation is preformed on the preform to create a finished container 20. Movement of the preform 16 and the finished container 20 between these stations is accomplished by a gripping and transfer mechanism 22.

Figure 6:
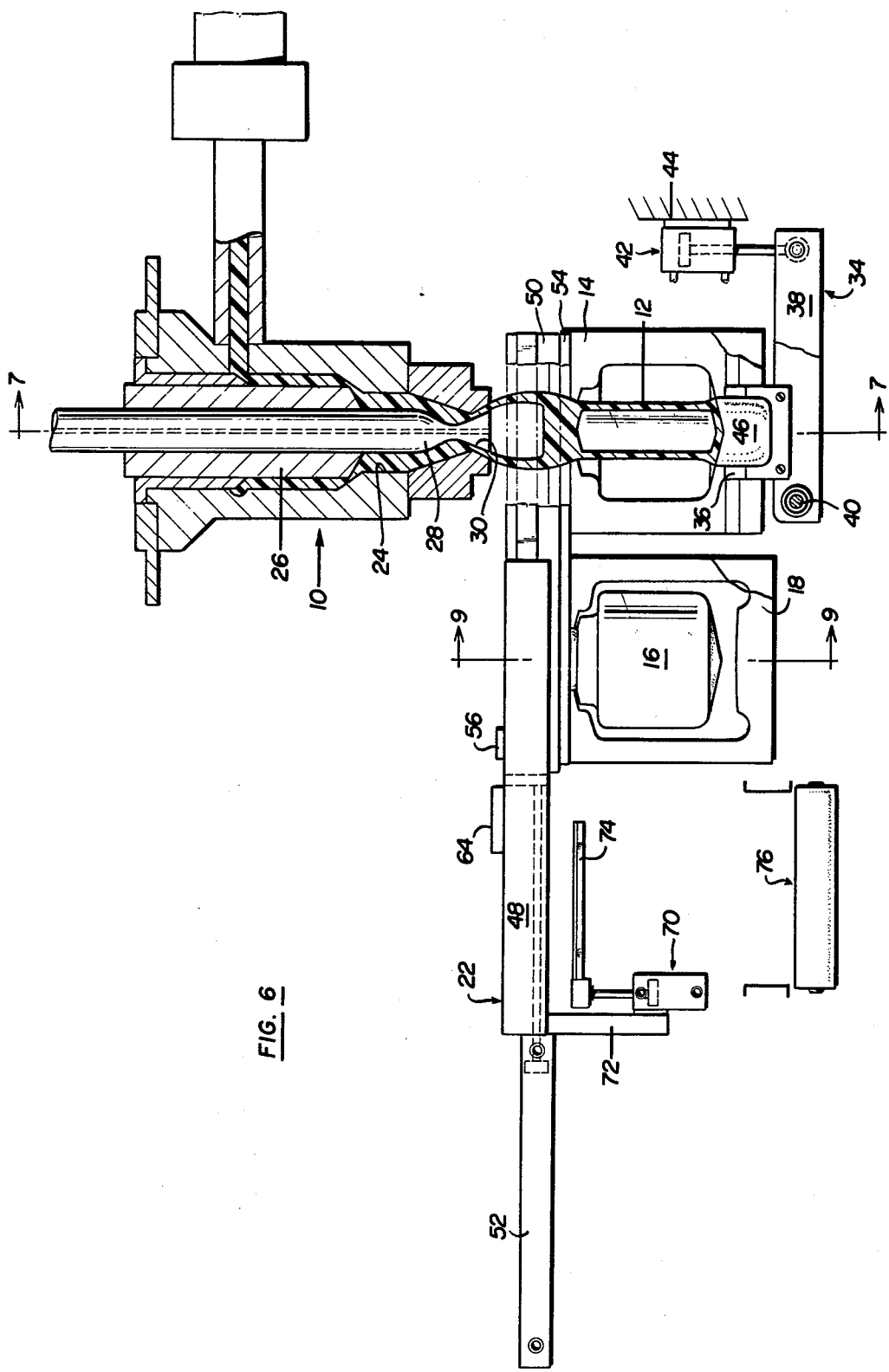
FIG. 6 is a side elevation, partly in section, similar to FIG. 1, but showing the system after the transfer mechanism has been extended to the preform station and after closing of the molds.

The extrusion head 10, best shown in FIGS. 1 and 6, incorporates accumulation and parison programming features. Thermoplastic material from a screw-type extruder accumulates in an accumulation chamber 24 from which it is ejected on signal by the downward stroke of a ram 26. The ram 26 concentrically surrounds a parison programming pin 28, which can be axially extended and withdrawn relative to a downwardly opening extrusion orifice 30 independently of the stroke of the ram 26.

As shown in FIG. 1, the annular gap between the lower end of the programming pin 28 in its downwardly extended position and the orifice 30 controls the wall thickness of the extruded parison 12. When the programming pin 28 is withdrawn upwardly, the complementary conical faces of the orifice 30 and the programming pin 28 cooperate to cut off the upper end of the extruded parison.

The illustrated extrusion head 10 may, for example, be a Bekum AK head manufactured and sold by Bekum Maschinen-Vertrieb of Berlin, Germany.

As shown in FIGS. 1 and 3, the parison is extruded downwardly into the space between the open opposed preform mold sections 14, one of which contains a blow needle 32. A tail pulling assembly 34 is also located at this preform station, and comprises a pair of opposed tail-gripping jaws 36 secured to a pair of arms 38 (see FIGS. 1-3). These arms are pivotally mounted at one end on shaft 40, while the position of their opposite ends is controlled by a cylinder and actuating rod assembly 42 secured to the frame 44 of the apparatus. Arms 38 and their associated jaws 36 are biased to a normally open position, as shown in FIG. 3, by compression springs acting outwardly on both ends of the arms.

Figure 7:
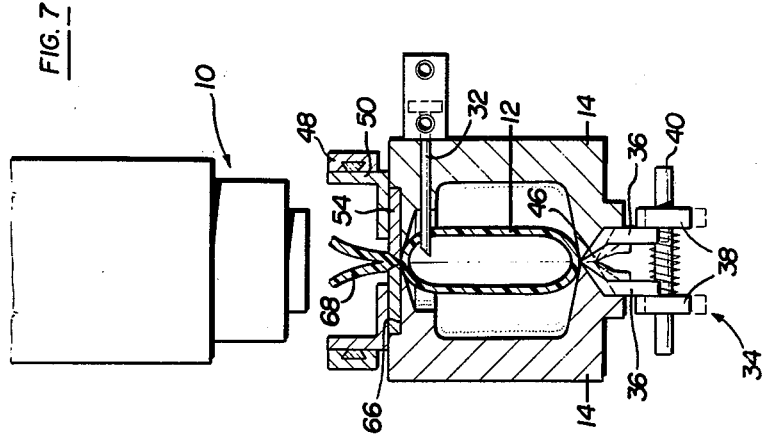
FIG. 7 is a side view, partly in section, similar to FIG. 3, taken along the plane 7—7 of FIG. 6.
Figure 8:
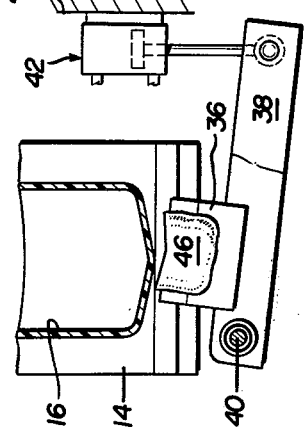
FIG. 8 is a partial view, similar to FIG. 7, but showing the bottom tail of the preform being removed by the tail pulling mechanism.
Figure 9:
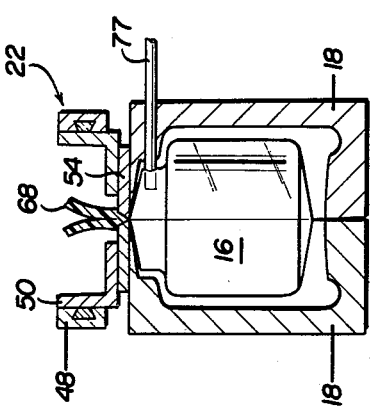
FIG. 9 is a side view in section, similar to FIG. 4, taken along the plane 9—9 of FIG. 6.

The closing stroke of the preform mold sections 14 automatically effects clamping of the lower tail of the parison, as a result of the engagement of the lower portions of the mold sections 14 with the clamping jaws 36 and the resulting inward movement of the jaws 36 against the compression of their associated springs. Thus, as shown in FIGS. 6 and 7, the tail 46 of the parison 12 is firmly clamped by jaws 36 immediately below the point at which the parison is pinched shut by the mold sections 14. Preferably after first stage blowing of the preform, the cylinder assembly 42 is actuated to cause the arms 48 and jaws 36 to rock downwardly about the shaft 40, thus severing tail 46 from the container preform 16, as shown in FIG. 8. Alternatively, tail 46 can be removed after closing of molds 14 but prior to blowing.

Figure 4:
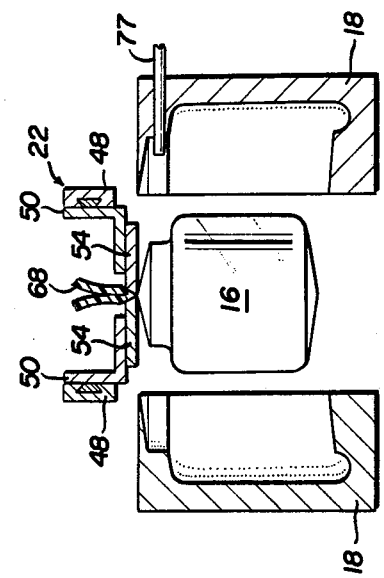
FIG. 4 is a side view, partly in section, taken along the plane 4—4 of FIG. 1.

As best shown in FIGS. 1, 2 and 4, the gripping and transfer mechanism 22 comprises a pair of guide tracks 48 which are slotted to cooperate with a pair of extendable arms 50 which extend and retract by sliding movement relative to the guide tracks 48 under the control of an extension cylinder 52. A pair of clamping jaws 54 is secured to arms 50 in a manner which permits the jaws to open and close by movement relative to their supporting arms. This arrangement comprises a pin 56 fixed to and extending vertically downwardly from the left end of each of the arms 50. Each pin rides in a short slot 58 in the adjacent jaw 54, with the slots 58 being arranged so that they converge toward the right as shown in FIG. 2. Similarly, a second pair of pins 60 extends vertically downwardly from the right end of each of the arms 50, these pins 60 riding in similarly converging slots 62 in the jaws 54. The gripping and transfer mechanism 22 further comprises a clamping cylinder 64 which is mounted to reciprocate with the extendable arms 50 under the influence of extension cylinder 52 (see FIGS. 1, 2 and 6). The rod of clamping cylinder 64 is connected to the left end of jaws 54, so that extension of such rod will cause jaws 54 to move toward the right relative to arms 50. This rightward relative movement is accompanied by an inward movement of jaw members 54 toward each other, as a result of the geometry of slots 58 and 62. In this fashion, clamping and unclamping of jaws 54 is accomplished by cylinder 64 independently of the extension of arms 50. This clamping arrangement is somewhat similar to that disclosed in prior U.S. Pat. No. 3,172,152.

The upper portions of the preform mold sections 14 cooperatively define an open-ended recess 66 dimensioned to receive the clamping jaws 54, as shown in FIGS. 3 and 7. Thus, the closing of preform mold sections 14 after extension and clamping of jaws 54 aids in achieving a tight clamping force on the upper tail 68 of the parison. As will be explained below, the preform 16 and finished container 20 are both suspended from the upper tail 68 during the transfer steps of the forming operations.

Figure 5:
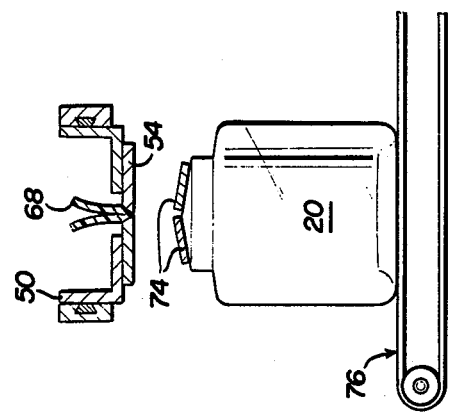
FIG. 5 is a side view, partly in section, taken along the plane 5—5 of FIG. 1, showing the completed container already separated from the upper tail.

After completion of the second and final blowing stage, the finished container 20 is separated from tail 68 at a separating station which comprises a container separating cylinder 70 fixed to machine frame 72, and provided with a pair of separator arms 74 fixed to the rod of cylinder 70, as shown in FIGS. 1, 5 and 6. The gap between arms 74 may, if desired, diverge toward the right, so that leftward movement of bottle 20 from final molds 18 to the separating station carries the upper portion of bottle 20 into the slot between arms 74. Subsequent retraction of the rod of separating cylinder 70 causes separating arm 74 to pull the finished container downwardly, thus severing it from tail 68 and depositing it upon a conveyor 76.

The operation of the shuttle type transfer mechanism disclosed in FIGS. 1 through 9 will now be described. For the purpose of this explanation, assume that the machine has just been started up, and the preform station, the final blowing station and the separation station are all empty.

With preform molds 14 in the open position of FIGS. 1 and 3, a parison 12 is extruded downwardly by the downward stroking of extruder ram 26. Simultaneously, cylinder 52 may be actuated to extend gripping and transfer mechanism 22 toward the right, with clamping jaws 54 being in their open position as determined by the retraction toward the left of the cylinder rod of clamping cylinder 64.

When the parison has reached its desired length, the stroke of the ram 26 is terminated and preform mold sections 14 can be closed by means of conventional actuating cylinders illustrated schematically in FIG. 2. Concurrently with or immediately preceding this mold-closing step, clamping cylinder 64 is actuated to clamp together upper tail clamping jaws 54, which have been previously fully extended by extension cylinder 52. The extending stroke of clamping cylinder 64, coupled with the engagement of clamping jaws 54 by the edges of jaw-receiving cavities 66 of the closing preform mold sections 14 effects a tight pinching and clamping of the upper tail 68 of parison 12. Programming pin 28 can then be withdrawn upwardly to cut off the top of parison 12. Material for the next successive parison then is accumulated in the chamber 24.

This closing stroke of mold sections 14 also effects a pinching and clamping of the bottom tail of the parison to form the lower tail 46 as mold sections 14 engage the clamp together tail clamping jaws 36.

With the preform mold sections 14 closed, the blow needle 32 can be extended by its associated cylinder (FIG. 7) to pierce the parison at its upper waste portion or moil within the mold cavity. After blowing of the preform, the tail pulling cylinder 42 is actuated to pivot arms 38 downwardly and clockwise about shaft 40, so that tail pulling jaws 36 tear off bottom tail 46 at the pinch line of the preform molds 14, as shown in FIG. 8.

Preform molds 14 can then be opened, and the still-closed gripping and transfer mechanism 22 retracted toward the left by extension cylinder 52 to transport the partially blown container preform 16 from the opened preform mold to the space between the open final mold sections 18. This position is illustrated in FIG. 4, wherein it can also be seen how preform 16 is suspended from the clamping engagement of the upper tail 68 by jaws 54 of the gripping and transfer mechanism 22.

With the previously formed preform 16 removed from registry with the extruder and with the preform 16 in proper position between the open final mold sections 18, the mold sections 18 can be closed, and simultaneously, extrusion of a new parison can begin at head 10. Once mold sections 18 are closed upon the preform 16, clamping jaws 54 of the gripping and transfer mechanism can be opened by retraction of the rod of clamping cylinder 64, and transfer mechanism 22 can then be extended to the preform station by cylinder 52 in preparation for clamping the upper tail of the newly formed parison. Thus, while the preform is within closed final mold sections 18, both during and after the second stage blowing operation, it is suspended from its upper tail 68 at the upper pinch line of mold sections 18, rather than by jaws 54. It will be noted that the clamping jaws 54 can be moved laterally relative to the closed final mold sections 18, but not relative to the closed preform sections 14.

The blow needle 77 of mold sections 18 is positioned in the same relative location as blow needle 32 of the preform mold sections 14, so that closing of the final mold sections 18 automatically causes blow needle 77 to enter the pre-existing hole left in preform 16 by the first stage blow needle 32. Proper registry of needle 77 with such hole is made possible by the fact that clamping jaws 54 grip a flattened portion of tail 68, thus precluding any misalignement resulting from twisting or rotation of the preform during its transfer between the mold stations. The second stage blowing operation can then be performed within mold sections 18 at any time after they have been closed, simply by introducing blow air through the needle 77. This allows time for cooling or thermally adjusting the temperature of the preform to the desired orientation temperature prior to the final blowing operation.

After completion of final blowing in mold sections 18 and completion of the concurrently performed initial blowing of the preform in preform mold sections 14, as described above, the opening of both pairs of mold sections and the retraction of gripper and transfer mechanism 22 will transport the newly formed preform 16 to final mold sections 18 and simultaneously transport the first container preform 16 (which has now been blown a second time to assume its final shape 20) to the separation station. With clamping jaws 54 still closed, the cylinder rod of separation cylinder 70 and the associated separation arms 74 are retracted downwardly from the position shown in FIG. 1 to the position shown in FIGS. 5 and 6, thus separating the finished container 20 from upper tail 68 and depositing it for removal of a lower conveyor 76. After the final mold sections 18 are closed on the newly formed container preform 16, the subsequent opening of clamping jaws 54 preparatory to the extension stroke by cylinder 52 will cause upper tail 68 at the separation station to fall through and be removed from the mechanism. Transfer mechanism 22 is then extended to the preform station, and the cycle repeated. This completes the explanation of the two-stage blowing operation performed by the embodiments of FIGS. 1 through 9.

EMBODIMENT OF FIGS. 10-16

FIGS. 10 through 16 illustrate a preferred embodiment of a two-stage blowing system wherein a rotary indexing rather than shuttle type of transfer mechanism is employed.

Figure 10:
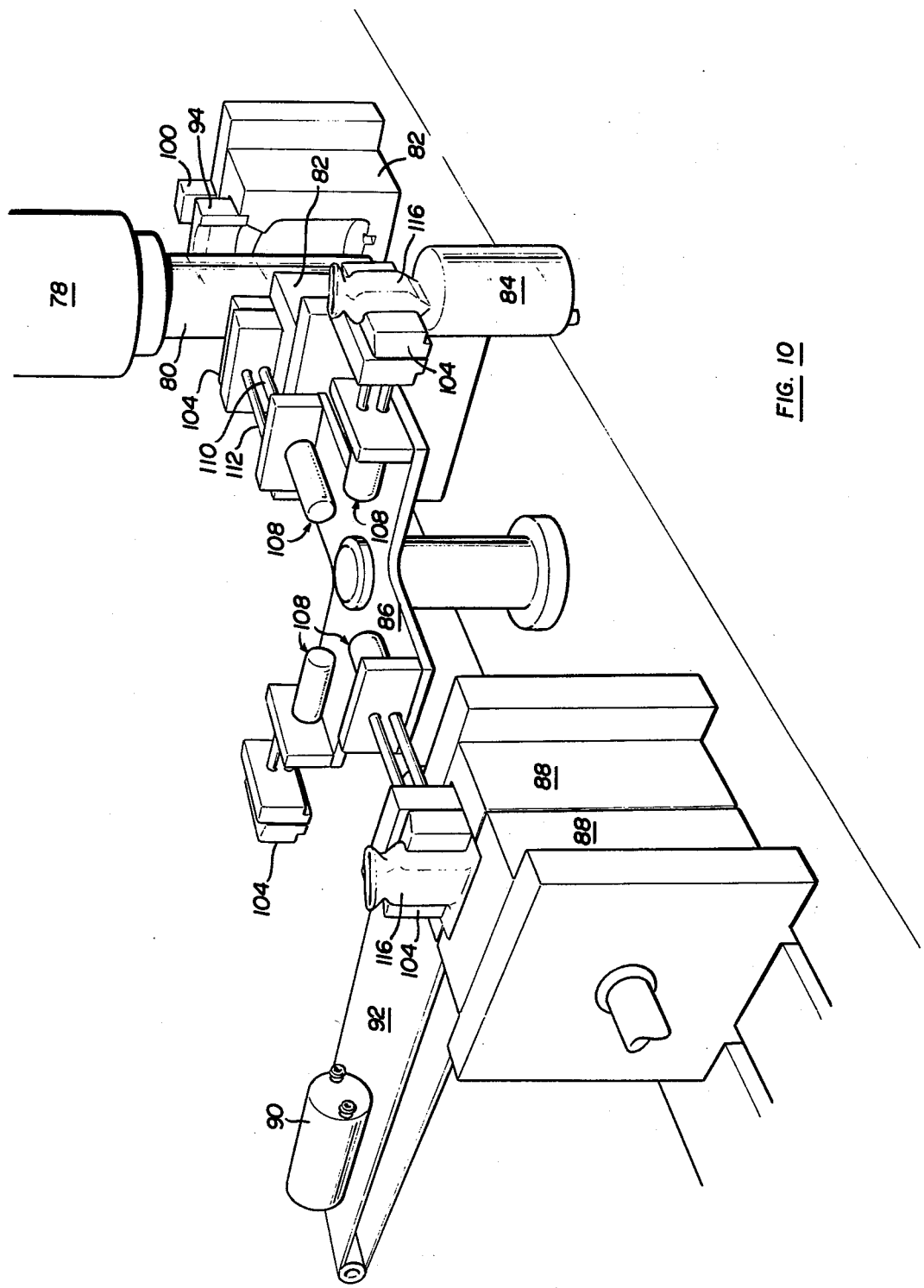
FIG. 10 is a perspective view of a two-stage blowing apparatus of the present invention employing a rotary index type of transfer mechanism.

As best shown in FIG. 10, the extrusion head 78 (which may be similar to that employed in the above-described shuttle transfer system embodiment) forms a parison 80 between the opened opposed preform mold sections 82. The container preform 84 formed therein is subsequently transported by rotary transfer mechanism or turning frame 86 to final blow mold sections 88, where the finished container 90 is formed by the second blowing operation and subsequently deposited on a removal conveyor 92.

In the embodiment illustrated in FIG. 10, four separate stations, spaced at 90° to each other, are illustrated. The four station configuration provides a preform station, a holding or thermal conditioning station, a final forming station and a removal station. Alternatively, a two-station system can be employed, using the same rotary indexing transfer mechanism, with merely a preform station and a final forming station.

Figure 11:
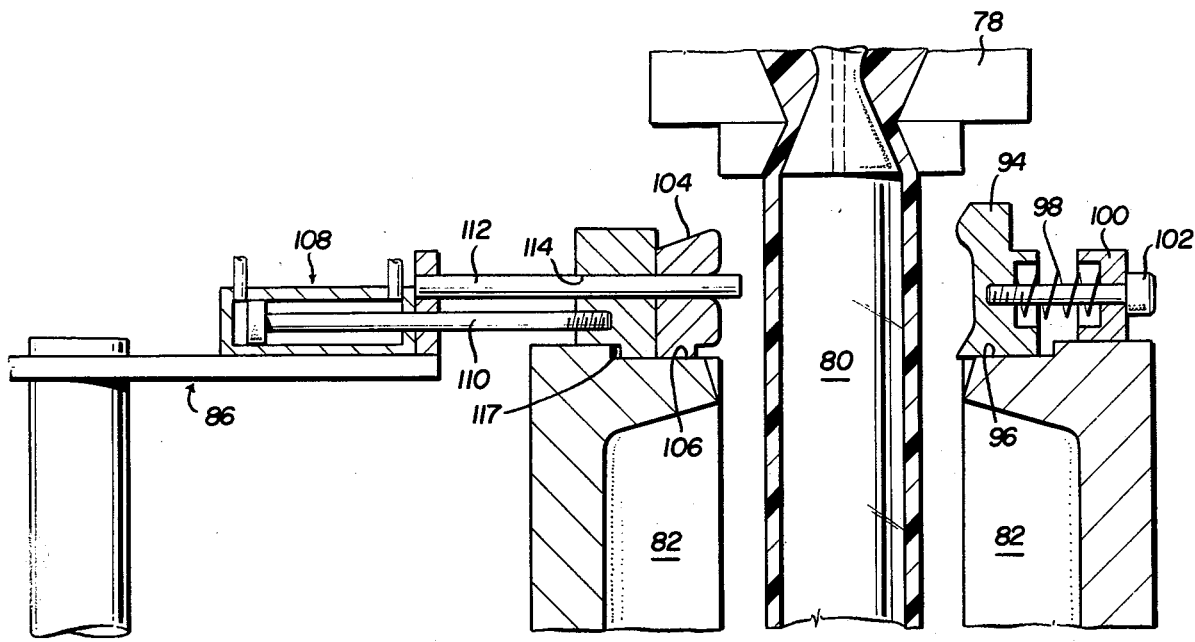
FIG. 11 is a fragmentary sectional view on an enlarged scale of the upper portion of the preform mold of FIG. 10, illustrating the clamping mechanism in an open position.

Referring now to FIGS. 10 and 11 in particular, the clamping means for engaging the upper tail or flash of parison 80 comprises two tail forms. One such tail form 94 is slidably mounted on a recessed portion 96 of the right or radially outward (relative to the axis of transfer mechanism 86) preform mold section 82. A compression spring 98, interposed between tail form 94 and an abutment 100 fixed to the outer mold section 82, biases the outboard tail form 94 radially inwardly toward the closing plane of the mold sections 82 until the head of bolt 102 engages abutment 100.

An inner or left tail form 104 is secured to the transfer mechanism 86 for rotary indexing therewith, and is removably nested on recess 106 in the upper portion of the left or radially inward mold section 82. Thus, the tail form 104 swings on a horizontal path into and out of registry with recess 106 as the transfer mechanism rotates. Radial gap 117 between tail form 104 and the shoulder of recess 106 permits the arcuate swinging of tail form 104 without interference. A radially extending tail form actuating cylinder 108 is rigidly mounted on a portion of rotary transfer mechanism 86, and a cylinder rod 110 is fixed to the left tail form 104. A tail form guide and ejector rod 112 parallel to the rod 110 is fixed to the transfer mechanism 86, and extends into a bore 114 in tail form 104, thus guiding the tail form 104 for radial sliding movement inwardly and outwardly on the guide and ejector rod 112 as the cylinder 108 is actuated, such movement being independent of the mold sections 84.

In operation, the extruding, blowing and bottom tail pulling steps can, if desired, all be accomplished in the manner described above with reference to the embodiments of FIGS. 1 through 9, such steps all being accomplished independently of the rotary indexing transfer mechanism illustrated in FIGS. 10-16. When the preform mold sections 82 are closed by appropriate means (not shown), the right tail form 94 is carried into engagement with parison 80 by its attachment to right mold section 82, while the position of left tail form 104 in recess 106 of the left mold section 82 causes it also to be carried into engagement with parison 80. If desired, such movement of tail form 104 can be alternatively or additionally effected by actuation of cylinder 108 to extend rod 110. The final closing movement of the mold sections causes the outer tail form 94 to yield against the compression spring 98 until it abuts the shoulder of recess 96 in the top of the mold section. Flash or tail 116 is thus formed between the two tail forms, without affecting the pinching shut of the parison by the mold sections 82.

Figure 12:
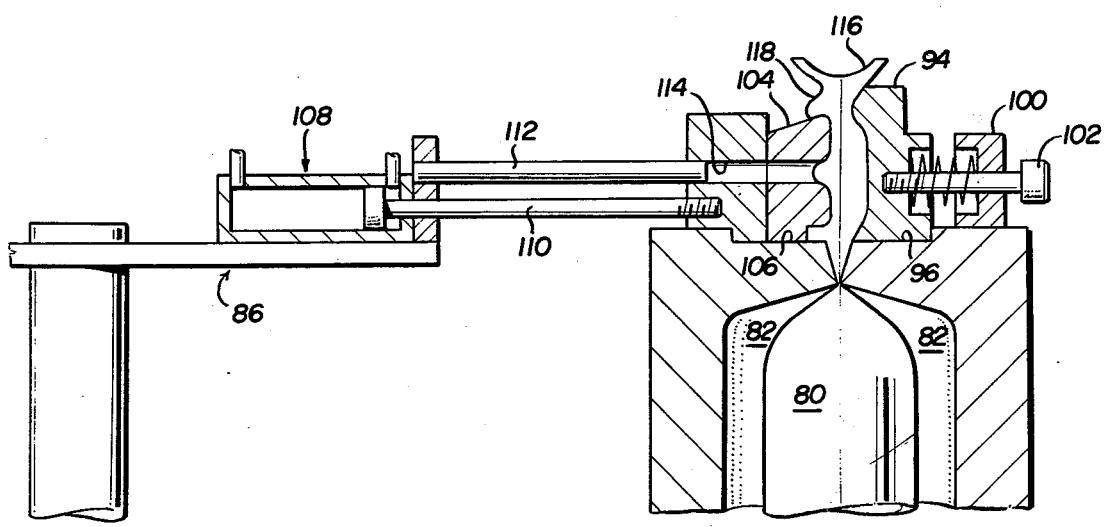
FIG. 12 is a view similar to FIG. 11, showing the clamping mechanism closed upon a waste portion of the parison.

As best shown in FIG. 12, the inner tail form 104 is wedgeshaped and radially inwardly convergent to cause an overhanging portion 118 of tail 116 to interlock therewith in dovetail fashion. This interlocking causes the tail 116 to be retained by the left or inner tail form 104 even after the mold is opened and the outer tail form 94 is withdrawn with the outer mold section 82.

Figure 13:
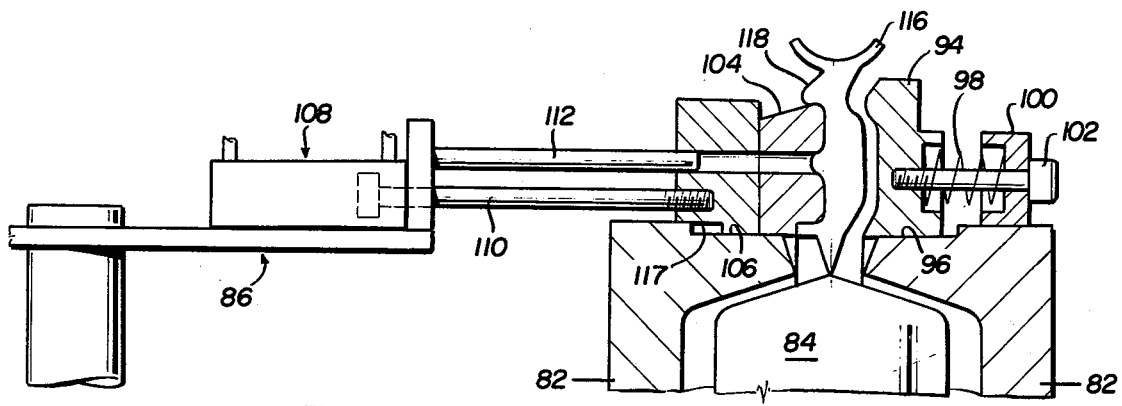
FIG. 13 to 16 are similar to FIG. 12, but show in sequence the opening of the preform molds after first stage blowing 13, the preform being suspended by the radially inner half of the flash clamp 14, the preform positioned within the closed final blow mold 15, and the completed product being separated from the transfer mechanism 16, respectively.

Thus, referring to FIG. 13, upon initial opening movement of the mold sections 82 the blown preform 84 and tail 116 is stripped from the outer mold section and the tail form 94. On the inner side, the leftward movement of left mold section 82 while the tail form 104 is held stationary by the piston rod 110 causes the preform 84 to be stripped from the left mold section. However, the tail 116 is interlocked with the inner tail form 104, and the blown preform 84 is retained by and suspended from the inner tail form 104 and from the indexing head 86.

Figure 14:
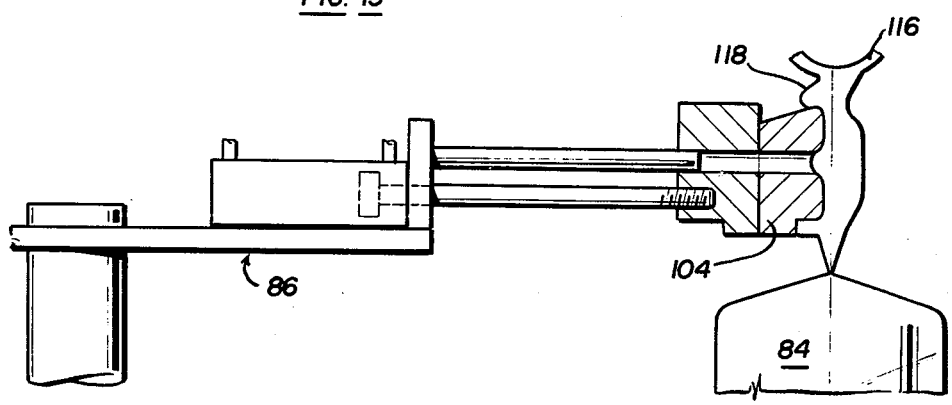

FIG. 14 shows the preform 84 completely free of the preform mold section and suspended from tail form 104, as would be the case after indexing of rotary transfer mechanism 86 through ninety degrees to a cooling station.

Figure 15:
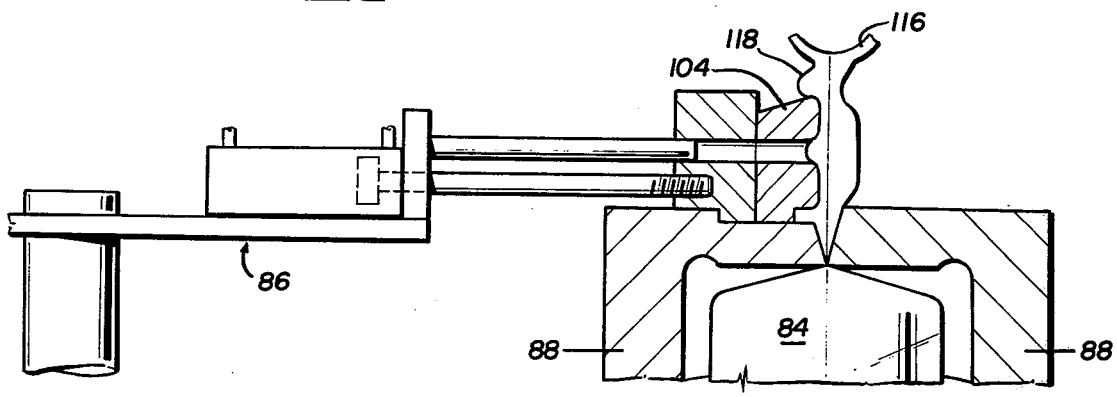
Figure 16:
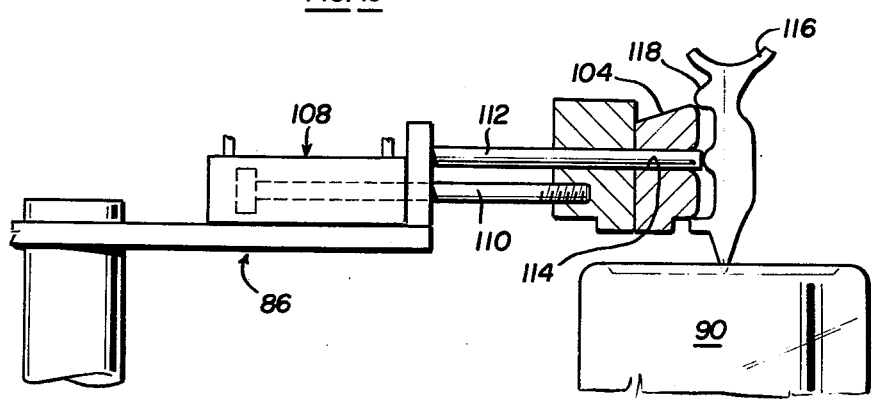

In FIG. 15, preform 84 has been transported to the final blowing station, and is shown inside of the closed final mold sections 88, where it is still suspended from and retained by the inner tail form 104. After final blowing and opening of final mold sections 88, the rotary indexing mechanism 86 can once again be indexed to transport final container 90, still suspended from tail form 104, to a separation station. There, separation is accomplished by actutating the tail form cylinder 108 to retract the rod 110, thus causing the inner tail form 104 to telescope inwardly over the fixed guide and ejector rod 112. At the completion of such stroke, rod 112 projects outwardly through its bore 114 (see FIG. 16), thus pushing tail 116 off of tail form 104, the resilient gripping portion 118 of tail 116 yielding to the displacing force of the cylinder 108.

Thus, the completed container 90 is dropped onto a conveyor 92, by way of example, for subsequent removal of the tail as desired.

EMBODIMENT OF FIGS. 17-31

Figure 18:
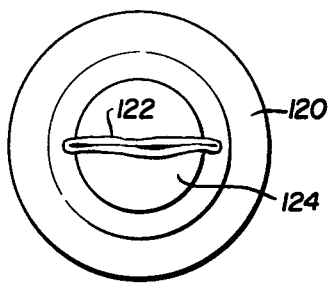
FIG. 18 is a top view of the drum of FIG. 17.
Figure 17:
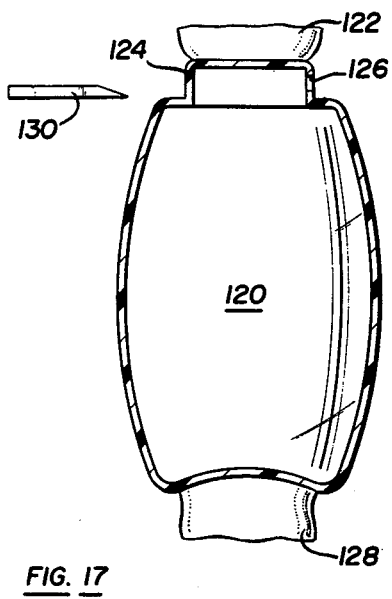
FIG. 17 is a side view of a open head type of drum, shown prior to removal of the top flash, moil and tail.
Figure 19:
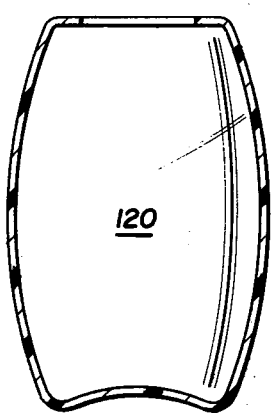
FIG. 19 is a view similar to FIG. 17, but showing the completed drum after trimming.

FIGS. 17-21 illustrate two forms of blow-molded drums. An open head drum 120 is illustrated in FIGS. 17-19, with FIGS. 17 and 18 illustrating it after blowing but before final trim. In such figures, the untrimmed drum 120 still has attached its top flash 122, a moil 124 containing blow hole 126 and a bottom tail 128. The moil and top flash are removed simultaneously by the stroke of cutter 130, while the bottom tail 128 can be removed by a tail puller such as is described above with reference to the disclosure of FIGS. 7 and 8.

Figure 20:
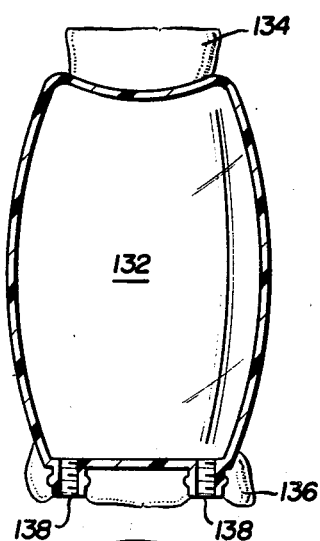
FIG. 20 is a side view, partly in section, of an untrimmed tight head type of drum having integrally formed internally threaded bungs.
Figure 22:
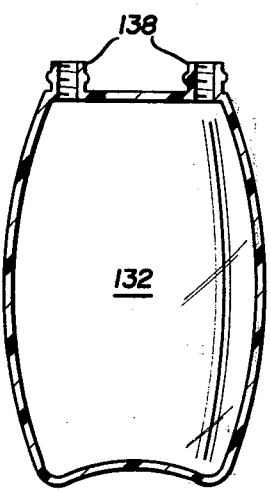
FIG. 22 is a side view in section of a completed and trimmed tight head type of drum.
Figure 21:
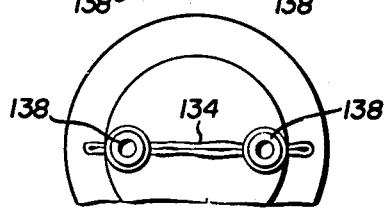
FIG. 21 is a bottom view of the drum of FIG. 20.

The embodiment of FIGS. 20-22 shows a tight head drum 132 with its top flash 134 and bottom tail 136 still attached in FIGS. 20 and 21. Drum 132 features integrally formed internally threaded bung holes 138 which can advantageously be formed by the method and apparatus disclosed in FIGS. 23-31, as described below.

Referring now to FIGS. 23-25, a tight head type of drum, such as shown in FIG. 22, is formed by extruding a parison 140 over a prepositioned spreader assembly 142. This assembly comprises guide posts 144 secured to a base 146 and slidably mounting an upper support plate 147 having an inner recess defining an elevation controlling cylinder 148. The plate 147 carries a pair of blow pins or nozzles 150 supplied by air hoses 152.

A pair of thread forming inserts 154 are removably slipped over the upper portion of blow pins 150, these inserts having external threads adapted to form the desired internal thread in the bungs of the drum. Blow pins 150 are transversely slidable within elongated slots 156 in the plate 147, the pins having radially enlarged collars 158 which are connected through arms 160 to the free end of piston rod 162 of a blow pin spreading cylinder 164. These elements combine to form a toggle linkage wherein retraction of the cylinder rod 162 causes blow pins 150 to move laterally apart in slots 156, as will be seen from a comparison of FIGS. 24 and 27.

Thus, the blow pins 150, as shown in FIGS. 23 and 24, are initially closely spaced through a distance small enough to permit parison 140 to be extruded downwardly over the inserts 154 positioned on blow pins 150. Prior to extrusion, cylinder 148 is actuated to elevate blow pins 150. Following extrusion, blow pin spreading cylinder 164 is actuated to retract cylinder rod 162, and to spread blow pins 150 apart within slots 156. This outward movement of blow pins 150 stretches parison 140 to the eliptical shape shown in FIG. 27. The spread position of blow pins 150 and bung thread forming inserts 154 illustrated in FIGS. 26 and 27 correspond with the final desired spacing of the bungs on the drum to be formed.

Following spreading of the blow pins, preform mold sections 168 are brought together by conventional means, and the first stage blowing operation is performed, with the air being admitted into the pinched parison through air lines 152 and blow pins 150. The blow pins register with semi-cylindrical recesses 169 formed in each mold section 168, the closure and the mold sections 168 pinching shut the parison between the blow pins and the bung forms 154 to form the flash indicated at 170. When the first stage blowing step is completed, the preform mold sections are opened and the elevation cylinder 148 is actuated to lower spreader assembly 142. This causes blow pins 150 to slide downwardly out of bung thread-forming inserts 154, which are now captured or retained as part of the bottom flash formed by the pinching together of preform mold sections 168. This condition is best illustrated in the upper portion of FIG. 29, where it can be seen that a portion of the flash 170 has surrounded inserts 154, thereby forming bungs 172 including the internal thread molded by the external contour of inserts 154.

After spreader assembly 142 has been lowered, the preform 166 can be transferred to a final blowing station by the shuttle transfer mechanism of FIGS. 1-9 or by the rotary index transfer mechanism of FIGS. 10-16, or by other desired means.

The final blow station is illustrated in FIGS. 29-31, and comprises a final blow pin assembly 174 which adjustably mounts a pair of final blow pins 176 supplied by air hoses 178. This structure is slidably mounted on guide posts 180 secured to base 182 and can be moved vertically by elevation cylinder 184.

Blow pins 176 are slidably mounted in transversely extending slots 186, and can be adjustably positioned therein by screws 188 which interconnect blow pin collars 190 and screw-holding bracket 192. Thus, the center-to-center spacing of final blow pins 176 can be precisely adjusted to correspond to the bung spacing created by spreader assembly 142 at the preform station.

Therefore, when the preform 166 has been transported to the final blowing station of FIG. 29 and properly positioned over the final blow pin assembly 174, cylinder 184 is actuated to raise blow pins 176 and insert them into the bores of bung thread-forming inserts 154. Thereafter, the final mold sections 194 can be closed and the second and final blowing step performed.

Upon completion of this final forming step, the completed container can be removed by any desired means, any remaining flash and tail trimmed off and inserts 154 threaded back out of bungs 172, thus leaving the desired internally threaded bung. Alternative to the above described use of a removable thread-forming insert, an internally threaded insert can be permanently installed in the drum by the same method described above.

It is to be further understood that the above-described method of inserting and spreading a thread or bung-forming insert can be employed with a single stage as well as two-stage blow molding technique for forming containers.

This invention can be further developed within the scope of the following claims. Accordingly, the above specification is to be interpreted as illustrative of only three operative embodiments of the present invention, rather than in a strictly limited sense.

I now claim:

1. In a method of blow molding, the steps of:
   (1) extruding a pendant tubular parison from an orifice located above and in vertical alignment with a pre-form blow mold,
   (2) interposing a transfer mechanism between the orifice and the pre-form blow mold, the transfer mechanism being movable in a horizontal plane relative to said pre-form blow mold and said orifice;
   (3) substantially simultaneously (a) engaging the parison intermediate the orifice and the pre-form blow mold with the transfer mechanism, and (b) closing the pre-form blow mold on that portion of said parison beneath said transfer mechanism,
   (4) severing the parison at the orifice and blowing the parison to a blown pre-form interiorly of said pre-form blow mold;
   (5) opening the pre-form blow mold to expose the blown preform still engaged by the transfer mechanism and freely pendant therefrom,
   (6) horizontally moving the transfer mechanism and the blown pre-form from alignment with the pre-form blow mold and into alignment with an open final blow mold,
   (7) closing the final blow mold onto the blown pre-form still engaged by and still pendant from said transfer mechanism,
   (8) releasing the pre-form form the transfer mechanism after the performance of Step (7),
   (9) again interposing the transfer mechanism between the orifice and the pre-form blow mold, for engagement with a subsequently extruded parison, and
   (10) blowing the blown pre-form interiorly of said final blow mold.

2. A method of forming blown thermoplastic containers by successively downwardly extruding tubular parisons from an overhead extrusion orifice, blowing successively extruded parisons in succession into pre-forms in a pre-form blow mold and then blowing the pre-forms in succession into containers in a final blow mold spaced from said pre-form blow mold and horizontally aligned therewith, comprising the steps of:
   closing the sections of the pre-form blow mold onto each of the successively extruded parisons in spaced relation to the orifice to form a blowable shape; closing a first pair of opposed gripping surfaces onto the parison beneath the orifice and above the pre-form blow mold to form a plastic waste segment; while simultaneously closing a second pair of similar opposed gripping surfaces onto the plastic waste segment (a) attached to a previously blown preform which is enclosed within the sections of a final blow mold and (b) extending above the sections of the final blow mold;
   severing the parison at the extrusion orifice;
   closing a final blow mold onto the previously blown pre-form suspended from said gripping surfaces;
   blowing the blowable shape into a pre-form interiorly of the preform blow mold, and blowing the previously blow pre-form into a container in the final blow mold cavity;
   opening the sections of the pre-form mold while leaving the gripping surfaces closed to suspend the blown pre-form from the waste segment held between the first pair of closed gripping surfaces;
   opening the sections of the final blow mold while leaving the gripping surfaces closed to suspend the blown container from the waste segment held between the second pair of closed gripping surfaces;
   simultaneously diplacing both pairs of closed gripping surfaces horizontally, to displace the blown pre-form from the location of the pre-form mold to the location of the final blow mold and to displace the blown container from the location of the final blow mold to an ejection station; and
   subsequently simultaneously displacing both pairs of gripping surfaces back to the location of the pre-form mold and the location of the final mold, after releasing the waste segments of the respective pre-form and the container.

3. In a method of blow molding wherein a blown plastic article is conveyed from a blow mold station, including the steps of closing the sections of a blow mold onto an essentially tubular thermoplastic parison to form a blowable plastic shape enclosed within a mold cavity, separating the parison from the extruder after closure of the blow mold sections, blowing the shape interiorly of the blow mold cavity to form a blown shape and then opening the blow mold sections to remove the blown shape from the cavity, the improvement of:
   closing a pair of compression members onto the parison above the blow mold sections as the blow mold sections close (1) to pinch shut the tubular parison and (2) to form a mechanical interlock between the pinched shut portion of the parison and one of the compression members; separating the two compression members as the blow mold sections open, to suspend the blown shape subsequent to opening of the blow mold sections by the mechanical interlock between the plastic material and said one compression member; and displacing said one compression member only from the blow mold station to remove the blown shape from between the blow mold sections.

* * * * *